(12) United States Patent
Benkui et al.

(10) Patent No.: US 11,473,623 B2
(45) Date of Patent: Oct. 18, 2022

(54) BEARING ASSEMBLY

(71) Applicant: AKTIEBOLAGET SKF, Gothenburg (SE)

(72) Inventors: Xia Benkui, Nanjing (CN); Hans Wallin, Cape Coral, FL (US)

(73) Assignee: AKTIEBOLAGET SKF, Gothenburg (SE)

( * ) Notice: Subject to any disclaimer, the term of this patent is extended or adjusted under 35 U.S.C. 154(b) by 29 days.

(21) Appl. No.: 17/091,361

(22) Filed: Nov. 6, 2020

(65) Prior Publication Data

US 2021/0156429 A1  May 27, 2021

(30) Foreign Application Priority Data

Nov. 25, 2019 (CN) .......................... 201911165570.5

(51) Int. Cl.
*F16C 19/54* (2006.01)
*F16C 33/66* (2006.01)
(Continued)

(52) U.S. Cl.
CPC .......... *F16C 33/6659* (2013.01); *F16C 19/54* (2013.01); *F16C 19/542* (2013.01);
(Continued)

(58) Field of Classification Search
CPC ...... F16C 19/54; F16C 19/542; F16C 19/541; F16C 19/546; F16C 19/547; F16C 25/06;
(Continued)

(56) References Cited

U.S. PATENT DOCUMENTS 3,578,232 A * 5/1971 Loyd ...................... F16C 19/54
82/147
4,915,514 A * 4/1990 Soderlund ............. F16C 19/545
384/616
(Continued)

FOREIGN PATENT DOCUMENTS

DE          19946383 A1 *  4/2001  ............. F16C 19/548
DE     102013217322 A1 *  3/2015  ........... F16C 33/6685
(Continued)

OTHER PUBLICATIONS

Machine Translation of DE-19946383-A1 (Year: 2001).*
Machine Translation of DE-102013217322-A1 (Year: 2013).*

*Primary Examiner* — Alan B Waits
(74) *Attorney, Agent, or Firm* — J-Tek Law PLLC; Scott T. Wakeman; Mark A. Ussai (57) ABSTRACT

A bearing assembly includes at least two bearings each having an inner ring and outer ring, the inner rings being mounted on a shaft, and a balancing piston being disposed between the two bearings. The balancing piston includes a first part and a second part, the first and second parts each contacting the outer rings of the two bearings in an axial direction. The balancing piston further includes an inlet for directing a pressure fluid between the first and second parts to provide pressure to the first and second parts such that the balancing piston adjusts or exerts axial force on at least one of the two bearings. The balancing piston includes an outlet for directing the pressure fluid to lubricate at least one of the two bearings. Also, the outer diameter of the balancing piston is greater than the outer diameter of the outer rings of the two bearings.

13 Claims, 3 Drawing Sheets

(51) Int. Cl.
*F16C 25/08* (2006.01)
*F16C 37/00* (2006.01)

(52) U.S. Cl.
CPC ............ *F16C 19/547* (2013.01); *F16C 25/08* (2013.01); *F16C 33/6677* (2013.01); *F16C 37/007* (2013.01)

(58) Field of Classification Search
CPC .... F16C 25/08; F16C 25/083; F16C 33/6659; F16C 33/6662; F16C 33/6674; F16C 33/6677; F16C 33/6685; F16C 37/00; F16C 37/007; F16C 39/04; F16C 2229/00
See application file for complete search history.

(56) References Cited

U.S. PATENT DOCUMENTS

| | | | |
|---|---|---|---|
| 5,009,583 A | | 4/1991 | Carlsson et al. |
| 5,411,388 A | * | 5/1995 | Soderlund ............... F01C 21/02 418/203 |
| 5,603,602 A | * | 2/1997 | Romani ................ F16C 19/548 415/105 |
| 2016/0069385 A1 | * | 3/2016 | Kim ........................ F16C 25/08 384/479 |

FOREIGN PATENT DOCUMENTS

| | | |
|---|---|---|
| EP | 1123150 B1 | 6/2006 |
| SE | 510924 C2 | 7/1999 |
| SE | 511251 C2 | 8/1999 |
| WO | 9117345 A1 | 11/1991 |

\* cited by examiner

BEARING ASSEMBLY

CROSS-REFERENCE

This application claims priority to Chinese Patent Application No. 201911165570.5, filed Nov. 25, 2019, the entire contents of which are fully incorporated herein by reference.

BACKGROUND OF THE INVENTION

The present invention relates to bearings, more particularly to bearing assemblies including at least two bearings.

The axial load capacity of rolling bearings depends on the bearing contact angle and type, size and number of rolling elements. Bearings can also be arranged in tandem to increase the total load capacity. The contact angle is defined as the angle of contact internally in the bearing. The larger the contact angle the higher the axial load capacity.

At high speed, centrifugal forces on the rolling elements create an induced axial force acting on the shaft in the opposite direction to the external force. The larger the contact angle the greater the induced force. If the induced force is greater than the external force, it will result in an axial displacement of the shaft in the direction opposite to the direction of the external force, which should be avoided. Such axial displacement can happen in machines, such as for example screw compressors, where the external force is relatively small at start up. The displacement can be limited by using a backup bearing that counteracts the displacement, but a backup bearing will induce a force on the thrust bearing(s) in addition to the external force and increase frictional heat. The force from the backup bearing increases the load on the thrust bearings and reduces product life. In order to reduce or eliminate induced force, a balancing piston may be used for providing a force in opposite direction to the induced force.

However, at the same time it is necessary to provide lubrication and cooling to the bearing to avoid damage due to high temperature and insufficiently lubricated bearings. High contact angle, high speed, and large bearing axial force all create more friction and frictional heat. To provide a bearing assembly that can operate at high speed with high force, it is necessary to have thrust bearings with large contact angle, and to have effective lubrication and cooling to remove the heat.

SUMMARY OF THE INVENTION

It is an object of the present invention to provide a bearing assembly with a balancing piston that is constructed such that the bearing assembly may be readily lubricated.

A bearing assembly in accordance with the present invention comprises at least two bearings each having an inner ring and outer ring, the inner rings of the at least two bearings being mounted on a shaft. The bearings may be any kind of bearing, for example ball bearings, roller bearings, tapered roller bearings or the like.

In a preferred embodiment, one of the two bearings is a thrust bearing and the other bearing is a four-point contact ball bearing. The four-point contact ball bearing is preferably a single row angular contact ball bearing with raceways designed to support axial loads in both directions. For a given axial load, a limited radial load can also be supported. Thrust bearings are typically designed to accommodate axial loads only. The thrust bearing may be a tapered roller bearing or an angular contact ball bearing. The thrust bearing may also be a combination of one or more tapered roller bearings or angular contact ball bearings or a combination of tapered roller bearings and angular contact ball bearings.

In order to keep the thrust bearings seated before and during startup or to avoid an axial displacement of the shaft, which can occur for example during start-up as explained above, the bearing assembly preferably includes a spring cooperating with a balancing piston arranged between the two bearings. The balancing piston includes a first part and a second part, the first part and the second part contacting the outer rings of the two bearings in an axial direction, wherein the balancing piston further includes an inlet for guiding a pressure fluid between the first part and the second part for provide pressure to each of the first and second parts such that the balancing piston is configured to adjust or apply an axial force to at least one of the two bearings.

By using a four-point contact ball bearing as backup bearing in combination with a balancing piston and one or more springs, it is possible to produce a spring force through the backup bearing, in the direction of an external force at start-up, and then by use of the balancing piston, to produce a force in the opposite direction under steady state operation. More specifically, when the balancing piston is energized, it first slightly compresses the springs, then exerts a force on the shaft in a direction opposite to the external force. In this manner, the thrust bearing(s) will be seated at start up by the spring force and then, at steady state, the piston force will counteract the external force, thus reducing the force on the thrust bearing(s) under steady state conditions.

For this purpose, the balancing piston applies an axial force via the first part and the second part through one of the bearings, e.g. the four-point contact ball bearing, in the opposite direction to the spring preload. The first part and the second part of the balancing piston are pushed apart by the pressure fluid, thus providing an axial force which reduces the force on the thrust bearings. Since the acting force of the balancing piston counteracts the spring force and the external force, the acting force of the balancing piston adjusts the axial force to at least one of the two thrust bearings. The axial force to at least one of the two thrust bearings is the sum of the external force, the spring force/preload and the acting force of the balancing piston.

In order to provide lubrication to the bearing assembly, in particular to the four-point contact ball bearing, in addition to the adjustment of the axial force, the balancing piston includes an outlet for guiding or directing the pressure fluid to lubricate at least one of the two bearings. Thus, the pressure fluid may be used both for providing pressure to adjust or apply axial force to reduce force on the thrust bearings and for lubricating the four-point contact ball bearing. Additional elements for lubrication of this bearing may be omitted.

The outlet for guiding/directing the pressure fluid as lubricant to at least one of the two bearings may be provided by a gap between the first part and the second part of the balancing piston. In addition, for example when lubrication via the gap between the two parts is not sufficient, the first part of the balancing piston may include at least one opening which opens to one of the four-point contact ball bearings. Alternatively or additionally, the bearing may be lubricated via the shaft and an inner ring spacer. The lubricant may be used for cooling and for lubrication of the four-point contact ball bearing. It should be noted that lubrication by means of the balancing piston may also be additional to another source of lubrication, for example via an inner ring spacer or may support such a lubrication.

The inlet of the balancing piston may be coupled to an external supply of pressure fluid, or in case of a screw compressor, coupled to the discharge pressure of a compressor. The pressure fluid may be for example an oil or a hydraulic fluid which can also serve as lubricant. The inlet may be, for example, an opening in the balancing piston in a radial direction of the bearing assembly.

According to one embodiment, the first part and the second part of the balancing piston form an annular piston-cylinder device in which the two parts are generally annularly shaped. In particular, an effective axial pressure surface of the annular piston-cylinder device may be greater than an axial side surface of the outer rings, for example may be greater by a factor of between about one and one-half and three (1.5-3), preferably between about two and two and one-half (2-2.5). Thus, the surface of the balancing piston pressing against the surface of the outer ring surface may be greater, leading to an effective transmission or transfer of pressure from the balancing piston to the outer ring. In particular, the outer diameter of the balancing piston is at least five percent (5%) greater than the outer diameter of the four-point bearing. With such an increased piston area, the piston force may be increased for a given pressure and therefore may result in a greater or increased balancing force.

In another embodiment, the bearing assembly includes thrust bearings, a balancing piston and a four-point contact ball bearing where the outer diameter of the balancing piston is at least five percent (5%) greater than the outer diameter of the four-point contact ball bearing.

According to a further embodiment, an outer diameter of the balancing piston is greater than the outer diameter of the outer rings of the bearings and an inner diameter of the balancing piston is smaller than an inner diameter of the outer rings of the bearings. Thus, the resultant force from the piston pressure is in line with the contact force on the four-point contact ball bearing outer ring. These dimensions of the balancing piston may ensure that the balancing piston, in particular the first part contacting the four-point contact ball bearing outer ring do not tend to warp. Warping of the piston can cause it to jam. Additionally, warping could also have negative impact on the bearing being contacted when the balancing piston touches the outer rings in only a small region. If the resultant force from the piston pressure is not in line with the contact force on the four-point contact ball bearing outer ring, the pressure may be not uniformly distributed. In such a case, the resultant force from the piston pressure might be offset (i.e., radially) from the contact force on the bearing outer ring, such offset forces potentially creating an overturning moment that warps the piston. Due to the dimensions of the balancing piston with respect to the dimensions of the bearing outer ring as described above, the pressure may be uniformly distributed, and the risk of warping will be reduced.

According to a further embodiment, the contact surface of the balancing piston, which contacts an area of the outer ring of the four-point-contact ball bearing, may be formed so as to be convex. Such a convex contact surface allows the contact point of the balancing piston force to remain substantially unchanged in case of warping.

According to a further embodiment, the bearing assembly includes an axial inlet for providing lubricant to the bearing assembly and an axial outlet for discharging or venting lubricant from the bearing assembly. The lubricant may be used both for lubricating the bearings and for cooling the bearings at the same time. The axial inlet may be arranged at one axial side of the bearing assembly and the axial outlet may be arranged at the opposite side of the bearing assembly. Thus, the lubricant may be fed to each bearing individually, through the whole bearing assembly, thereby providing lubrication to all of the bearings.

In a further embodiment, the bearing assembly includes at least three bearings and a substantially radial inlet disposed between the inner rings of two of the bearings to provide lubricant to the bearings. Such an inlet may be coupleable with an axial hole of the shaft for providing lubricant to the bearings. The shaft may be configured as a hollow shaft and may include one or more radial, or substantially radial, opening(s) which can be coupled to the inlet between the inner rings of the bearings for providing lubricant to the bearings. Alternatively, the inlet may be couplable to an external lubricant reservoir outside the bearing assembly. Further, a spacer may be arranged between the outer rings and/or the inner rings of two bearings and the inlet may be located within the spacer.

For discharging the lubricant from the bearing assembly, an outlet may be at least arranged between the outer rings of two bearings. Thus, the lubricant may be supplied via the inlet(s) and may be discharged via the outlet(s) so that there is a lubrication flow through the bearings, improving both lubrication and cooling. Like the inlet, such an outlet may also be arranged within a spacer.

In particular, each bearing may be lubricated via individual inlets and outlets for maximum cooling and lubrication conditions. The lubricant flow path extend through the center of the shaft, through radial holes in the shaft and inlets to the thrust bearings on one side, and the lubricant may be discharged on the other side, wherein each thrust bearing has a separate flow path and the flow direction is in the pumping direction of the bearing. In other words, the lubricant flow path extends from radially inside to radially outside of the bearing assembly. The lubricant within each bearing may be discharged into a space between the bearing outer rings and the housing. Thereafter, the lubricant may be discharged from this space, preferably by means of a common outlet. Also, the lubricant may be simultaneously used both for cooling as well as for lubrication.

According to a further embodiment, the (hollow) shaft is closed at one end with a ring, the ring providing an inlet being couplable with an external lubrication supply. The ring may ensure that the lubricant does not back flow out of the shaft.

By the bearing assembly disclosed herein, it is possible to provide a combination of effective cooling and lubrication as well as thrust bearings with high axial load capacity that allows for high load capacity at high speed.

Further preferred embodiments are defined in the dependent claims as well as in the description and the figures. Thereby, elements described or shown in combination with other elements may be present alone or in combination with other elements without departing from the scope of protection.

BRIEF DESCRIPTION OF THE SEVERAL VIEWS OF THE DRAWINGS

In the following, preferred embodiments of the invention are described in relation to the drawings, wherein the drawings are exemplarily only, and are not intended to limit the scope of protection. The scope of protection is defined by the accompanied claims, only. The figures show:

DETAILED DESCRIPTION OF THE INVENTION

In the following detailed description, the same or similar functioning elements are generally indicated with the same reference numerals.

Figure 1:
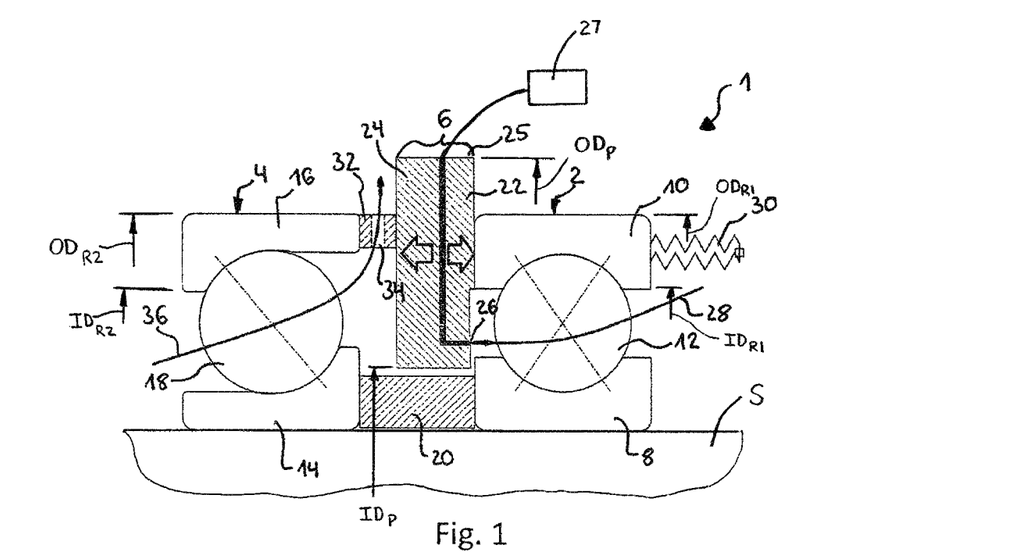
FIG. 1 a schematic sectional view of a part of a bearing assembly according to a first embodiment of the invention.

FIG. 1 shows a portion of a bearing assembly 1 which is illustrated with two bearings 2, 4. Between the two bearings 2, 4, a balancing piston 6 is arranged or disposed. The first bearing 2 is preferably a four-point contact ball bearing with an inner ring 8, an outer ring 10 and one or more rolling elements 12, preferably spherical balls. The bearing 2 may support axial loads in both directions and may also support a limited radial load.

The second bearing 4 is preferably a thrust bearing with an inner ring 14, an outer ring 16 and one or more rolling elements 18, preferably spherical balls. The bearing 4 in this embodiment accommodates substantially only axial loads. The bearing 2 and the bearing 4 are separated via a spacer 20 at their inner rings 8, 14, i.e., the spacer 20 is disposed between the inner rings 8, 14 of the two bearing 2, 4, respectively.

In order to reduce the forces on the bearings 4, the bearing assembly 1 further comprises the balancing piston 6, as mentioned above. The balancing piston 6 includes a first part 22 and a second part 24, with the first part 22 and the second part 24 each contacting the outer rings 10, 16 of the two bearings 2, 4, respectively, in an axial direction. That is, the balancing piston 6 is disposed axially between the two bearings 2, 4 such that the first part 22 of the balancing piston 6 contacts the outer ring 10 of the first bearing 2 and the second part 24 of the balancing piston 6 contacts the outer ring 16 of the second bearing 4, preferably through a spacer 32 (described below).

Preferably, each of the first part 22 and the second part 24 of the balancing piston 6 is substantially annular and formed diametrically larger than each of the outer rings 10, 16 of the first and second bearings 2, 4, and preferably all other bearings as described below, such that an outer diameter $OD_P$ of the balancing piston 6 is greater than an outer diameter $OD_{R1}$, $OD_{R2}$ of each of the outer rings 10, 16, as indicated in FIG. 1. Also, the balancing piston 6 is preferably sized such that an inner diameter $ID_P$ of the balancing piston 6 is lesser than an outer diameter $ID_{R1}$, $ID_{R2}$ of each of the outer rings 8, 16, as is also indicated in FIG. 1. As such, the axial side surface of each part 22, 24 of the balancing piston 6 is substantially greater than the axial side surface of each of the outer rings 10, 16 of the first and second bearings 2, 4, respectively.

Further, the balancing piston 6 includes an inlet 25 which may be coupled to an external pressure fluid supply 27. The inlet 25 is used for guiding or directing a pressure fluid between the first part 22 and the second part 24 in order to provide or exert pressure on or to the first part 22 and the second part 24. As such, the balancing piston 6 functions as an annular piston-cylinder device in which the two parts 22, 24 displace axially relative to each other due to the pressure on each part 22, 24 generated by the pressure fluid. Due to the larger axial side surfaces of each of the first and second parts 22, 24 in comparison with the axial side surfaces of the bearing outer rings 10, 16 as described above, the annular piston-cylinder device provided by the balancing piston 6 has an effective axial pressure surface exerted against the outer rings 10, 16 that is greater than the ring axial side surfaces, for reasons discussed below.

Preferably, the bearing assembly 1 further includes a spring element 30 providing an axial spring force (i.e. producing a preload) on the bearing 2, particularly before and during startup. The spring element or spring 30 is configured to apply a preload force on one side of the outer ring 10 of the first bearing 2, and the purpose of the spring preload is to keep the second, thrust bearing 4 seated. However, at steady state operating conditions an axial force is induced by the thrust bearing(s) due to centrifugal forces. The induced force is counteracted by the spring force and an external force having the same direction as the spring force. This means that the force in the thrust bearing(s) is high. The balancing piston 6 may be used to counteract the axial forces, i.e. to eliminate or at least cancel or reduce the spring force by compressing the spring 30.

For this purpose, the balancing piston 6 applies an axial force via the first part 22 and the second part 26 to the first bearing 2. The axial force applied by the balancing piston 6 acts in the opposite direction to the spring preload force. The balancing piston force exerted on the four-point contact ball bearing 2 also acts in the direction opposite to the external force, and is transmitted to the shaft S through the four-point contact ball bearing 2, thereby reducing the force on the thrust bearings(s) 4 and therefore extending the life of the thrust bearing(s) 4. The first part 22 and the second part 24 of the balancing piston 6 are pushed apart by the pressure fluid, thus applying the axial force on the four-point contact ball bearing 2. This will also be described with reference to FIGS. 4 and 5.

In order to provide lubrication and cooling of the first bearing 2, the balancing piston 6 includes an outlet 26 for guiding the pressure fluid as lubricant to the bearing 2, i.e., the pressure fluid is also used as a lubricant after utilization as piston working fluid. The lubricant flow is illustrated by arrow 28. Thus, the pressure fluid provides two separate functions, specifically, the fluid provides pressure to the balancing piston 6 in order to adjust the axial force acting on the bearing 4 (being a sum of the external force, the spring preload and the force of the balancing piston 6) and is thereafter used to lubricate and cool the bearing 2.

The second, thrust bearing 4 may be spaced apart from the balancing piston 6 by a spacer 32. The spacer 32 may include or provide an outlet 34 for discharging lubricant from the bearing 4, the flow of such lubricant being illustrated by arrow 36 in FIG. 1. The lubricant for the bearing 4 may be supplied via different openings, which will be explained in the following figures. The lubrication of the second bearing 4 is separate from the first bearing 2 as the first bearing 2 is preferably lubricated by means of the pressure fluid from the balancing piston 6.

Alternatively, the first bearing 2 may also be lubricated through a radial hole (not shown) provided in the spacer 20. Such a lubrication mechanism may be necessary if a separate lubricant pump (not shown) is used in a pre-lubrication cycle, i.e. before start-up, since the piston 6 must not be energized before start-up.

Figure 2:
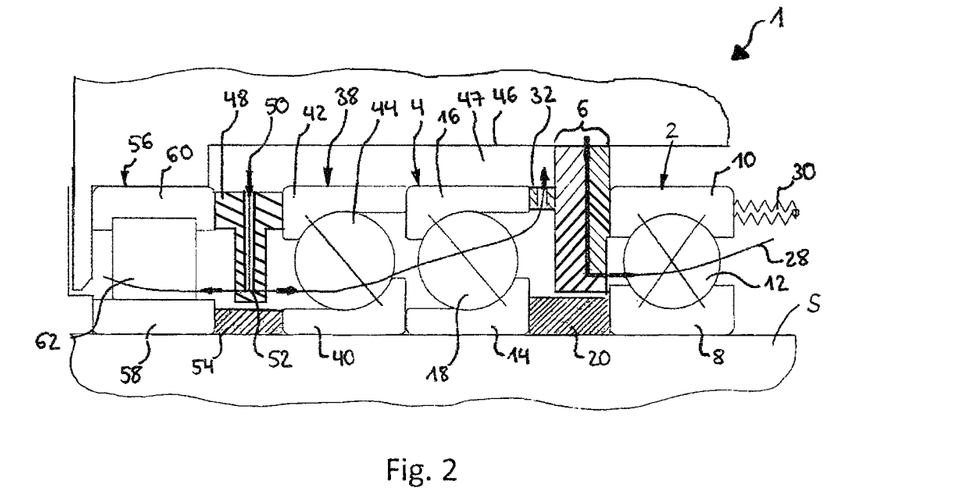
FIG. 2 a schematic sectional view of the whole bearing assembly of FIG. 1.

FIG. 2 shows the components of the bearing assembly 1 of FIG. 1 and further comprising another thrust bearing 38 in tandem with the second, thrust bearing 4. As depicted, the bearing assembly 1 of FIG. 2 comprises a total of four bearings: the four-point contact ball bearing 2, the thrust bearing 4, another or second thrust bearing 38 and a cylindrical roller bearing 56.

The third bearing or second thrust bearing 38 comprises an inner ring 40, an outer ring 42 and one or more rolling elements 44, which are each preferably a spherical ball. Preferably, the bearings 2, 4 and 38 are arranged within a housing 46.

The fourth bearing 56 is preferably a cylindrical roller bearing for taking or supporting radial loads and comprises an inner ring 58, an outer ring 60 and a plurality of cylindrical roller elements 60 arranged between the inner and outer rings 58, 60, respectively. The inner rings 40, 58 of the third and fourth bearings 38, 56, respectively, are preferably separated by means of a spacer 54. The radial load is transmitted through a housing 46; specifically, the outer ring 60 of the fourth bearing 56 contacts the housing 46. The three other bearings 2, 4, 38 take or support axial loads only and an annular gap 47 is formed between the outer rings 10, 16, 42 and the housing 46 to prevent them from taking radial loads, i.e., the gap 47 prevents the transfer of radial loading between the shaft S and the housing 46 through the bearings 2, 4 and 38.

The outer rings 42, 60 of the bearings 38, 56, respectively, are preferably separated by means of a spacer 48. In this embodiment, the spacer 48 has an opening 50 which functions as a radial inlet for supplying lubricant into the bearings 56, 38, 4. The spacer 48 also has a radial opening 52, which opens both in the direction of the bearings 38, 4 and also in the direction of the bearing 56. The flow of the lubricant is illustrated by an arrow in FIG. 2, starting from the inlet 50 and flowing through the outlet 52 to the bearing 56 and through the bearings 38 and 4, flowing outwardly from the bearing assembly 1 by means of the outlet 34 of the spacer 32. In this construction of the bearing assembly 1, the second bearing 4 is lubricated with lubricant that has passed through the bearing 38. Such a supply of lubricant may be sufficient for lubrication and cooling of the second bearing 4, since both bearings 38, 4 are ball bearings that generate less frictional heat than other types of roller bearings, such as cylindrical rollers, etc. Thus, in this embodiment, the bearing assembly 1 is lubricated from the radially outer side of the bearing assembly 1. Further, the inlet 50 may be coupled with an external lubricant reservoir (not shown).

Figure 3:
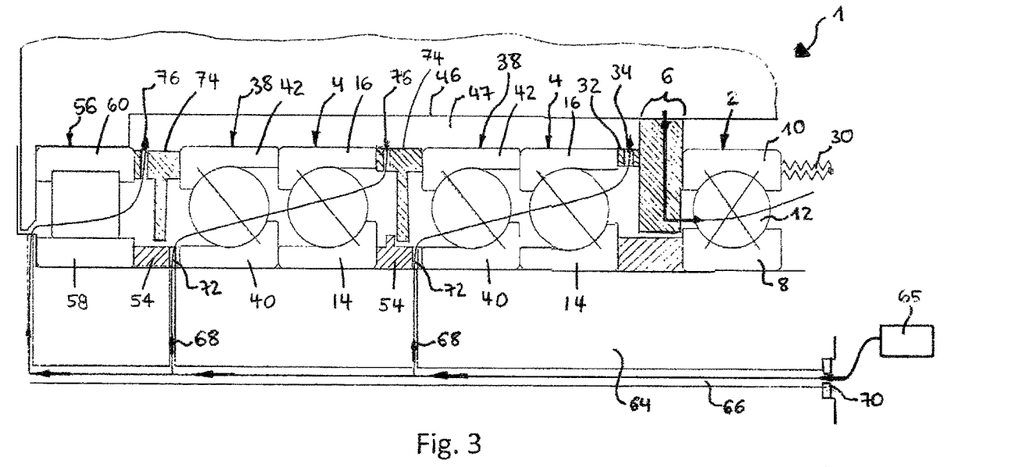
FIG. 3 a schematic sectional view of a bearing assembly according to a second embodiment of the invention.

FIG. 3 shows another embodiment of the bearing assembly 1, which comprises the first bearing 2 of FIGS. 1 and 2, the cylindrical roller bearing 56 of FIG. 2, and two tandem bearing pairs each consisting of the bearings 4 and 38 of FIG. 2. A first inner spacer 54 is located between the inner ring 40 of the first tandem pair and the inner ring 14 of the second tandem pair and a second inner spacer 54 is located between the inner ring 40 of the second tandem pair and the inner ring 58 of the cylindrical roller bearing 56. Further, a first outer spacer 74 is located between the outer ring 38 of the first tandem pair and the outer ring 16 of the second tandem pair and a second outer spacer 74 is located between the outer ring 42 of the second tandem pair and the outer ring 60 of the cylindrical roller bearing 56.

In this embodiment, the lubrication of the bearings 4, 38 and 56 occurs through the radially inner side of the bearing assembly 1, i.e. from the side of a shaft 64. For this purpose, the shaft 64 is configured as a hollow shaft with a center hole or central bore 66 coupled with an external lubricant supply 65. From this bore or hole 66, one or more radial outlets 68 each lead to an inlet 72 of the inner spacers 54. The outer spacer 32 and two outer spacers 74 provide outlets 34, 76 for venting or discharging lubricant from the bearing assembly 1. Thus, as depicted by arrows in FIG. 3, lubricant flows from the center hole/central bore 66 of the shaft 64 through the openings 68 and through the inlets 72 into the bearings 4, 38 and 4, 38 and 56. The lubricant then flows out of the bearings 4, 38 and 4, 38 and 56 through the outlets 34, 74 to the outside or exterior environment of the bearing assembly 1. Due to the continuous flow of new lubricant passing through the bearing assembly 1, lubrication of the bearings 4, 38 and 4, 38 and 56 is improved. Further, in order to prevent a back flow of lubricant from the center hole 66 of the shaft 64, the center hole or central bore 66 of the shaft 64 is preferably closed with a ring 70 and lubricant is sprayed into the shaft 64 through the ring 70.

Figure 4:
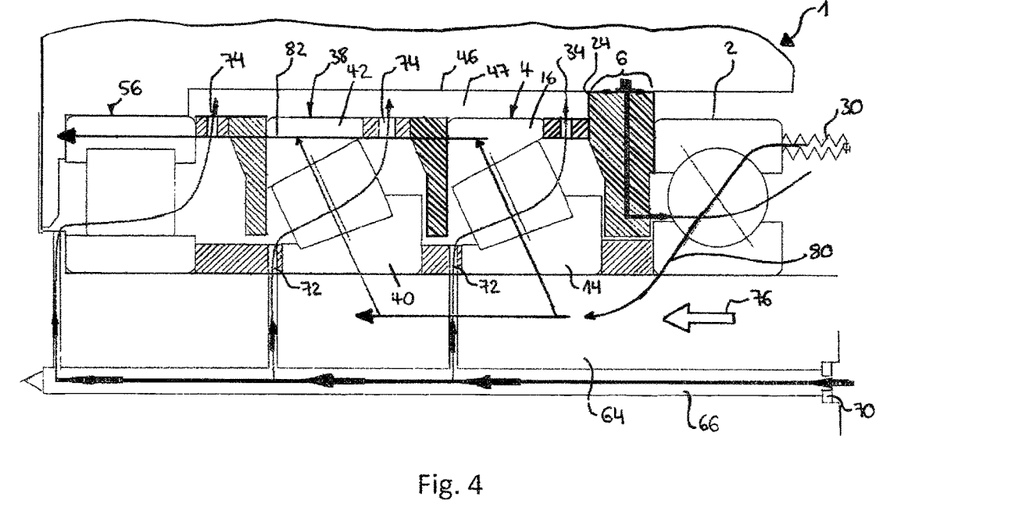
FIG. 4 a schematic sectional view of a bearing assembly according to a third embodiment of the invention including forces within the bearing assembly during start-up.

FIG. 4 shows another embodiment of the bearing assembly 1 in which the bearings 4, 38 are formed as tapered roller bearings instead of ball thrust bearings. In comparison with the embodiments of FIGS. 1 to 3, the second part 24 of the balancing piston 6 is formed wider (i.e., axially enlarged) at a radially outer section as greater width is required to take up or occupy the space between the outer rings 16, 42 of the bearings 4, 38, respectively.

As shown in FIG. 4, in a first operating stage, i.e. for example during start-up, an external force 76 is zero at startup and increases gradually with increasing speed. This external force is increased by a spring force 80 of the spring 30 through the backup bearing 2 in the direction of the external force 76 at start-up, resulting in a bearing force 82 for loading and seating the tapered roller bearings 4, 38.

Figure 5:
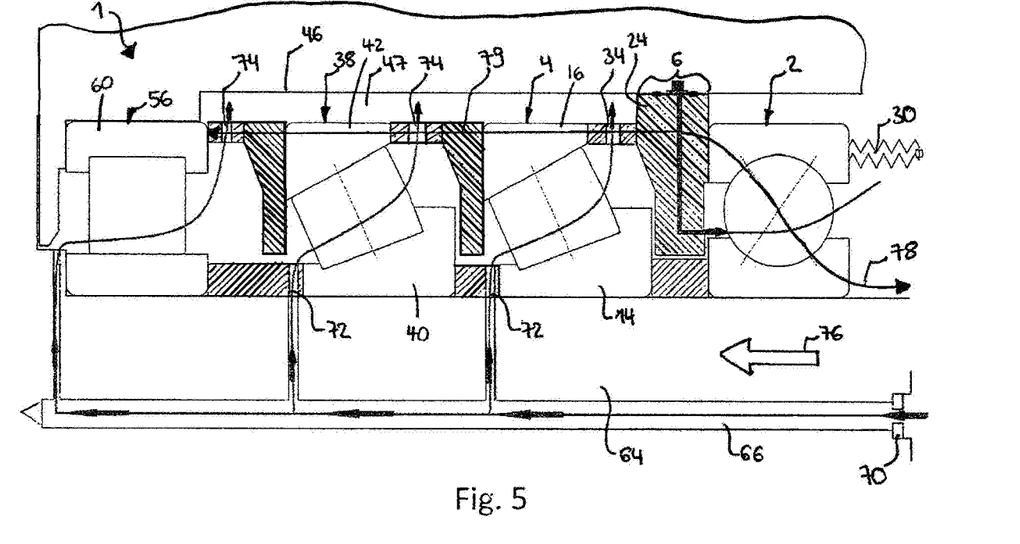
FIG. 5 the schematic sectional view of the bearing assembly of FIG. 4 including forces within the bearing assembly during steady-state.

In a second operating stage as shown in FIG. 5, for example during steady-state operation, the balancing piston 6 when energized first compresses the spring 30, then exerts a force 78 on the shaft 64 directed opposite to the external force 76. The balancing piston 6 also applies a force 79 in the opposite direction of the force 78, which is transferred by the spacers 34, 74 and the outer rings 16, 42, 60 of the respective bearings 4, 38, 56 to the housing 46. Thus, the thrust bearing(s) 4, 38 are seated at start up by the spring force 80 and then at steady state operation the piston force 78 counteracts the external force 76, thereby reducing the force on the thrust bearing(s) 4, 38 under steady state conditions.

Figure 6:
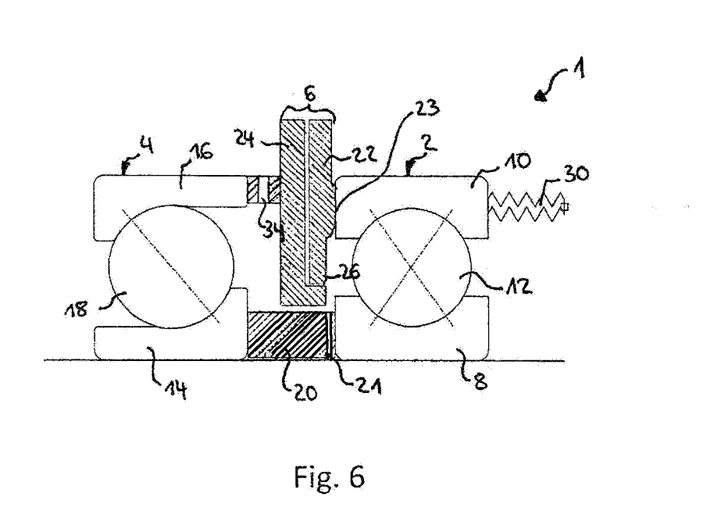
FIG. 6 a schematic sectional view of a part of a bearing assembly according to a fourth embodiment of the invention.

FIG. 6 shows a further embodiment of the bearing assembly 1. In this embodiment, the of the balancing piston 6 has a convex contact surface 23 which engages with an area of the outer ring 10 of the first or four-point-contact ball bearing 2. The convex contact surface 23 allows the contact point of the balancing piston 6, and thus the balancing piston force, remains substantially unchanged in case of warping of the bearing assembly components. Further, as is also shown in FIG. 6, the first bearing 2 may be lubricated through a radial inlet 21 in the inner spacer 20, which is necessary when a separate lubricant pump is used in a pre-lubrication cycle (i.e., before start-up) since the piston 6 must not be energized before start-up.

It should be noted that the features of the different embodiments of the bearing assembly 1 may be combined or some of the features of one embodiment may be exchanged with the features of another embodiment, for example the lubrication supply from the side of the shaft with the lubrication supply from the radially outer side of the bearing assembly. Further, the kind of bearings used in the embodiments (ball bearings, tapered roller bearings, cylindrical roller bearings) is only exemplary and any other kind of bearings may be used, also the bearings may be used in different combinations. In summary, the herein described bearing assembly provides a high axial load capacity, an improved control of the shaft axial displacement and in addition, lubrication and cooling of the bearing assembly without additional elements.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

REFERENCE NUMERALS 1 bearing assembly
2 four-point contact angle bearing
4 thrust bearing
6 balancing piston
8 inner ring
10 outer ring
12 ball
14 inner ring
16 outer ring
18 rolling element
20 spacer
21 radial inlet
22 first part
23 convex face
24 second part
26 outlet
28 lubricant flow
30 spring element
32 spacer
34 outlet
36 lubricant flow
38 thrust bearing
40 inner ring
42 outer ring
44 rolling element
46 housing
47 space
48 spacer
50 inlet
52 outlet
54 spacer
56 bearing
58 inner ring
60 outer ring
62 rolling element
64 shaft
66 axial hole
68 opening
70 ring
72 inlet
74 outlet
76 external force
78 piston force
79 piston force
80 spring force
82 bearing force

We claim:

1. A bearing assembly comprising:
at least two bearings each having an inner ring and outer ring, the inner rings of the at least two bearings being mounted on a shaft; and
a balancing piston disposed between the two bearings and including a first part and a second part, the first part contacting the outer ring of one of the two bearings in an axial direction and the second part contacting the outer ring of the other one of the two bearings in an axial direction, the piston having an inlet for directing a pressure fluid between the first part and the second part to provide pressure on each of the first and second parts so as to apply an axial force to at least one of the two bearings;
wherein the balancing piston includes an outlet for directing the pressure fluid to lubricate at least one of the two bearings,
the outlet being formed between an inner surface of the first part and an axial shoulder of the second part such that all of the pressure fluid is directed into the at least one of the two bearings.

2. The bearing assembly according to claim 1, wherein the first part and the second part form an annular piston-cylinder device.

3. The bearing assembly according to claim 2, wherein an effective axial pressure surface of the annular piston-cylinder device is greater than an axial side surface of the outer rings.

4. The bearing assembly according to claim 1, wherein an inner diameter of the balancing piston is smaller than an inner diameter of the outer rings of the bearings.

5. The bearing assembly according to claim 1, wherein the bearing assembly comprises an inlet for providing lubricant to the bearing assembly and an outlet for discharging lubricant from the bearing assembly.

6. The bearing assembly according to claim 1, wherein the bearing assembly comprises at least three bearings, wherein an inlet is disposed between the inner rings of at least two of the three bearings for providing lubricant to the bearings.

7. The bearing assembly according to claim 6, wherein the inlet is couplable with an axial hole of the shaft for providing lubricant to the bearings or wherein the inlet is couplable to an external lubricant reservoir outside the bearing assembly.

8. The bearing assembly according to claim 6, wherein an outlet is at least arranged between the outer rings of two bearings for discharging lubricant from the bearings.

9. The bearing assembly according to claim 8, wherein:
a spacer is arranged between the outer rings and/or the inner rings of two bearings and the inlet and/or the outlet extends through the spacer.

10. The bearing assembly according to claim 6, wherein the shaft is partially closed at one end with a ring, the ring providing an inlet being couplable with an external lubrication supply.

11. The bearing assembly according to claim 1, wherein the bearing assembly further comprises a spring configured to apply force on one side of the outer ring of one of the two bearings and the balancing piston is configured to apply force on an opposing side of the outer ring of the one bearing.

12. A bearing assembly comprising:
at least three bearings each having an inner ring and outer ring, the inner rings of the at least two bearings being mounted on a shaft; and
a balancing piston disposed between the two bearings and including a first part and a second part, the first part contacting the outer ring of one of the two bearings in an axial direction and the second part contacting the outer ring of the other one of the two bearings in an axial direction, the piston having an inlet for directing a pressure fluid between the first part and the second part to provide pressure on each of the first and second parts so as to apply an axial force to at least one of the two bearings;
wherein the balancing piston includes an outlet for directing the pressure fluid to lubricate at least one of the two bearings, the outlet being formed between an inner surface of the first part and an axial shoulder of the second part such that all of the pressure fluid is directed into the at least one of the two bearings; and
wherein an inlet is provided in a spacer arranged between the inner rings of two of the three bearings for providing lubricant to the bearings and an outlet is provided by a spacer arranged between the outer rings of two of the three bearings for discharging lubricant from the bearings.

13. A bearing assembly comprising:
at least three bearings each having an inner ring and outer ring, the inner rings of the at least two bearings being mounted on a shaft; and
a balancing piston disposed between the two bearings and including a first part and a second part, the first part contacting the outer ring of one of the two bearings in an axial direction and the second part contacting the outer ring of the other one of the two bearings in an axial direction, the piston having an inlet for directing a pressure fluid between the first part and the second part to provide pressure on each of the first and second parts so as to apply an axial force to at least one of the two bearings;
wherein an inlet is provided in a spacer arranged between the inner rings of two of the three bearings for providing lubricant to the bearings and an outlet is provided by a spacer arranged between the outer rings of two of the three bearings for discharging lubricant from the bearings.

* * * * *